March 26, 1974 P. C. DEMAREST ET AL Re. 27,949
METHOD OF MAKING A LIGHT BULB WITH A PLURALITY OF INDEPENDENTLY CONNECTED FILAMENTS FOR INDICATING GRAPHIC SYMBOLS
Original Filed May 6, 1966
FIG. 1
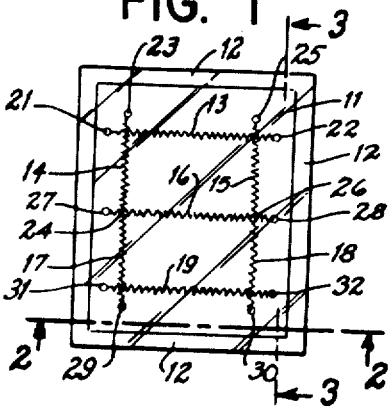
FIG. 3
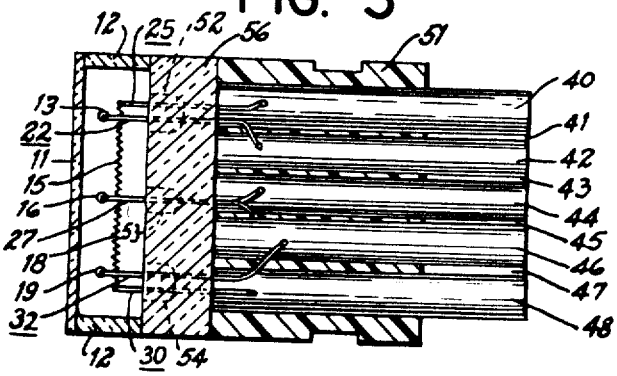
FIG. 2
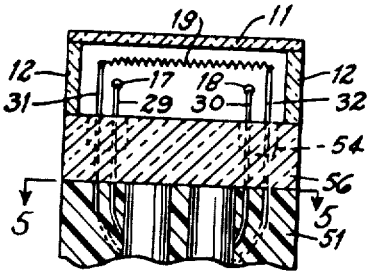
FIG. 4
| FILAMENTS | 1 | 2 | 3 | 4 | 5 | 6 | 7 | 8 | 9 | 0 |
|---|---|---|---|---|---|---|---|---|---|---|
| 13 | | x | x | | x | x | x | x | x | x |
| 14 | | | | x | x | x | | x | x | x |
| 15 | x | x | x | x | | | x | x | x | x |
| 16 | | x | x | x | x | x | | x | x | |
| 17 | | x | | | | x | | x | | x |
| 18 | x | | x | x | x | x | x | x | x | x |
| 19 | | x | x | | x | x | | x | x | x |
FIG. 5
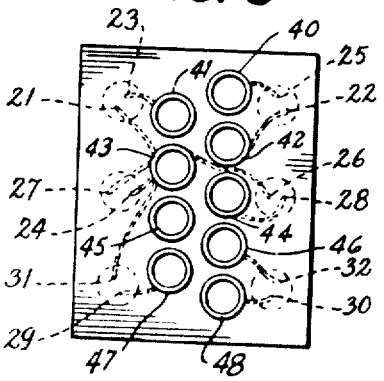
FIG. 6
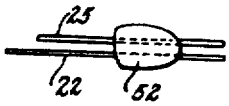
FIG. 7
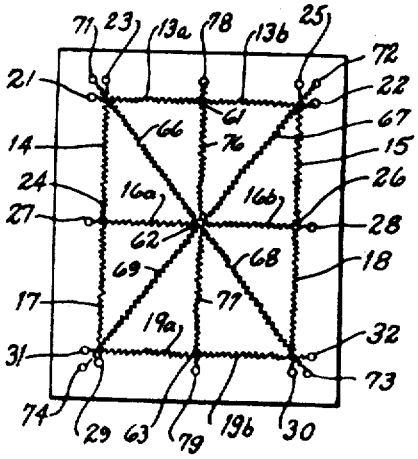
FIG. 8
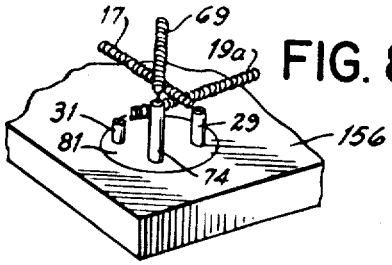

United States Patent Office

Re. 27,949
Reissued Mar. 26, 1974

27,949

METHOD OF MAKING A LIGHT BULB WITH A PLURALITY OF INDEPENDENTLY CONNECTED FILAMENTS FOR INDICATING GRAPHIC SYMBOLS

Philip C. Demarest, Pine Brook, N.J., and Karl Karlson, Fishkill, N.Y., assignors to Refac Technology Development Corporation Original No. 3,529,335, dated Sept. 22, 1970, Ser. No. 745,145, July 16, 1968, which is a division of application Ser. No. 548,193, May 6, 1966, now Patent No. 3,408,523. Application for reissue Sept. 8, 1972, Ser. No. 287,415

Int. Cl. H01j *9/36*

U.S. Cl. 29—25.16 3 Claims

Matter enclosed in heavy brackets [ ] appears in the original patent but forms no part of this reissue specification; matter printed in italics indicates the additions made by reissue.

ABSTRACT OF THE DISCLOSURE

A method of manufacturing a filamentary light having a plurality of filaments, each supported at each end by a metal support post and arranged within an enclosure comprising a rear wall and faceplate, the method comprising sealing pairs of the posts to individual glass beads and, subsequently, sealing the beads in space locations in the rear wall with the post extending therethrough.

This invention relates to a method of making a small, multi-filament electric light in which the filaments are so placed that when they are energized selectively by electric currents, they produce patterns of light that correspond to letters, numbers, and other graphic symbols.

This is a divisional application of co-pending application, Serial. No. 548,193, filed on May 6, 1966, now Pat. No. 3,408,523, issued Oct. 29, 1968, entitled "Light Bulb with a Plurality of Independently Connected Filaments for Indicating Graphic Symbols."

One of the objects of the present invention is to provide a method of making a very small light using filaments to produce alphanumeric and related symbols. Another object is to provide a method of making a filamentary light for producing graphic symbols in which the lines making up the symbols are sharply defined, are substantially all in one plane, and in which the illumination of each line extends the full desired length of the line to the corner of an intersecting line, if necessary.

In accordance with the objects of the invention, a miniature light is provided, usually in the form of a parallelepiped, having a transparent faceplate, or at least certain transparent line areas on the faceplate and filament arranged behind such faceplae to produce an image corresponding to letters or numbers when the filaments are selectively energized. The filaments are substantially parallel to the faceplate and extend between pairs of supporting posts and are attached to these posts on slightly different levels. These levels depend on the direction of the filaments with respect to the edges of the front surface of the structure. The filaments and the ends of the posts supporting the filaments are enclosed by the walls of the light with the enclosure either evacuated or filled with inert or non-oxidizing gas.

This invention contemplates a method of manufacturing a filamentary light having a plurality of filaments each supported at each end by a metal support post and arranged within an enclosure comprising a rear wall and a faceplate. The method comprises sealing pairs of posts to individual glass beads and, subsequently, sealing the beads in space locations in the rear wall with the post extending therethrough.

This invention will be defined in greater detail in the following specification together with the drawings, in which:

FIG. 1 is a front view of a simplified filament light structure capable of being illuminated to produce images of numerals;

FIG. 2 is a cross-sectional view of the structure of FIG. 1 along the line 2—2;

FIG. 3 is a cross-sectional view of the structure of FIG. 1 along the line 3—3;

FIG. 4 is a chart of the relationship between the individual filaments in FIG. 1 and the numerals;

FIG. 5 is a working diagram showing the interconnection between the support posts and the terminals of the light of FIG. 1;

FIG. 6 shows a support post assembly for a pair of the posts in FIG. 1;

FIG. 7 is a front view of a more complex light capable of reproducing alphabetical as well as numerical symbols; and FIG. 8 is a fragmentary perspective view of one section of the light of FIG. [6] *7*.

The light in FIG. 1 comprises a rectangular glass faceplate 11 sealed along its perimeter to side walls 12, which may be glass or metal. Behind the faceplate 11 are several filaments 13–19 connected to supporting posts 21–32. More particularly, the filament 13 is connected from the post 21 to the post 22, the filament 14 is connected from the post 23 to the post 24, the filament 15 is connected from the post 25 to the post 26, the filament 16 is connected from the post 27 to the post 28, the filament 17 is connected from the post 24 to the post 29, the filament 18 is connected from the post 26 to the post 30, and the filament 19 is connected from the post 31 to the post 32.

These filaments outline a character-defining area except for the filament 16 which goes horizontally across the centre of this area. With only the filaments shown in FIG. 1, the light is suitable for producing all of the ten numerals from zero to 9. For example, the numeral 1 is produced by causing the filaments 15 and 18 to become illuminated, the numeral 2 is reproduced by causing all of the filaments except filaments 14 and 18 to become illuminated, the numeral 3 is produced by causing all of the filaments except filaments 14 and 17 to become illuminated, the numeral 4 is reproduced by causing all of the filaments except the filaments 13, 17 and 19 to become illuminated, the numeral 5 is reproduced by causing all of the filaments except the filaments 15 and 17 to become illuminated, the numeral 6 is reproduced by causing all of the filaments except filament 15 to become illuminated, the numeral 7 is reproduced by causing filaments 13, 15 and 18 to become illuminated, the numeral 8 is reproduced by causing all of the filaments to become illuminated, the numeral 9 is reproduced by causing all of the filaments except the filament 17 to become illuminated, and the numeral zero is reproduced by causing all of the filaments except the filament 16 to become illuminated.

It is an advantage of the way that the filaments cross each other in accordance with the present invention that the numerals are reproduced substantially without gaps. That is, the cross bar at the top of the 7, which constitutes the filament 13, crosses the upper end of the filament 15 and therefore when both of these filaments are illuminated, there is no gap in the light emanating from that portion of the filaments 13 an 15 where they cross each other. On the other hand, there is no extension of the light beyond the cross-over point for the reason that the very end part of each filament tends not to be incandescent because of the drain of heat away from the filament and into the supporting posts therefor.

There may be a gap in the vertical part of, for example, the numeral 7 between the filaments 15 and 18 because the common ends of these two filaments are both attached to the common support post 26 which drains heat away from the ends of the filaments, but even this gap can be reduced by providing additional support posts, one for the lower end of the filament 15 and the other for the upper end of the filament 18 with the support post for the lower end of the filament 15 being below the support post for the upper end of the filament 18 as viewed in FIG. 1 to produce the effect of an overlap of the illuminated parts of these filaments.

FIGS. 2 and 3 show side cross-sectional views of the structure of FIG. 1 and illustrate the spacing of the filaments from the inner surface of the faceplate 11. Only the filament 19 is shown in FIG. 2, the other filaments 16 and 13 parallel with it being directly behind it. The filament 19 is stretched between the upper ends of the posts 31 and 32 and is relatively close to the inner surface of the faceplate 11. The posts 29 and 30 to which the filaments 17 and 18 are connected are not as tall as the posts 31 and 32 and therefore, the filaments 17 and 18, which are hidden by the upper end of the posts 29 and 30, pass beneath the filament 19 and are farther away from the faceplate 11. This is illustrated in FIG. 3 which shows the filaments 15 and 18 but not the other filaments perpendicular thereto.

The distance between the plane in which the filaments 14 and 15, 17 and 18 lie and the plane in which the filaments 13, 16 and 19 lie may be quite small and of the order of a few thousandths of an inch so that when the lighted filaments are viewed through the faceplate 11, the filaments running in both directions appear to be in substantially the same plane.

In order to illuminate any one of the filaments, the two supporting posts to which it is connected must be electrically connected to a source of voltage. Because the filaments in the present light are so small, this source of voltage may be correspondingly small, for example, on the order of one volt, although the light may be made in larger sizes for larger voltages as well. An important advantage of the incandescent filamentary structure of the present lights is that the voltage may be varied as required to vary the light intensity. In dark areas the intensity may be reduced with a more than corresponding increase in longevity of the light.

FIG. 4 is a chart showing the filaments that have to be illuminated to produce each of the ten numerals. By connecting one end of each filament to a common terminal, any numeral can be produced by connecting the other terminal of appropriate filaments to a single voltage source. The connection to the filaments are shown in FIGS. 3 and 5.

The right hand section of FIG. 3 shows one way of forming terminals for connection of external circuits to the filaments in the illuminated part of the light. In this embodiment there are nine such terminals in the form of hollow terminals 40–48 of which the terminals 40, 42, 44, 46 and 48 are in front of the terminals 41, 43, 45 and 47 so that only a small section of each of the latter terminals is visible between adjacent ones of the even numbered terminals. As may be seen, the support post 25 for one end of the filament 15 is directly connected to the terminal 40 while the support post 22 is directly connected to the terminal 42. The other support post 26 for the filament 15 passes between the terminals 44 and 46 and through an insulating block 51 to the terminal 45. The support post 28 is connected to the terminal 44 and the support posts 30 and 32 respectively, are connected to the terminals 48 and 46. All of these connections between the support posts and the terminals may be made by welding or by any other convenient means. The insulating block 51 may be an epoxy block formed in place to help lock the illuminated part of the light to the terminal structure and to hold the terminals 40–48 firmly in place.

Because of the fact that the support posts 24 and 26 are common to more than one filament, these support posts should be connected to a common terminal as shown in FIG. 5. FIG. 5 is a view of the terminal end of the light and shows that the support posts 21, 24, 26, 27 and 31 are all connected to a common terminal 45. The other support posts are connected to individual terminals to permit a voltage source to be connected between one or more of these individual terminals and the common terminal 45 to illuminate one or more of the filaments.

Because the support posts are ranged in closely spaced pairs, it is convenient in manufacturing the light to produce initial substructures consisting of pairs of the [supports] *support* posts supported in glass beads. One such substructure is shown in FIG. 6. As may be seen in FIG. 6, a glass bead 52 supports two support posts, a shorter post 25 and a long post 22. In addition, in order to provide a channel through which the chamber in which the filaments are located may be evacuated and perhaps to be filled with an inert gas, one of the posts, for example, the post 25 may be hollow, to be sealed shut after the light has been evacuated or filled with gas.

Referring to FIG. 3 it will be seen that the support posts with their individual glass beads 52, 53 and 54 have been made a part of monolithic glass base structure 56 which is sealed to the side walls 12 of the illuminated part of the structure. A permissible alternative structure is to make the base 56 out of metal, in which case the glass beads 52, 53 and 54 will not lose their identity but must be hermetically sealed to the metal. This may be done in a variety of ways, including forming matched coefficient fields of such materials as borosilicate glass for the beads and Kovar for the metal. Other matching coefficient components are No. 52 nickel iron alloy for the support posts and metal base and a lime or lead glass having a coefficient of expansion of around 88 to about $92\times10^{-7}$ units/unit length/° C. Glass having a coefficient in this range comes acceptably close to matching the coefficient of expansion of No. 52 nickel iron alloy. Still further matching pairs may be used, or the base structure 56 might be formed by means of compression sealing techniques.

While FIG. 1 shows a light that is capable of reproducing images of all of the numerals from zero to 9, FIG. 7 shows a light with additional filaments that make it capable of reproducing not only the numerals but all of the letters of the English alphabet. In the light structure of FIG. 7, the three horizontal filaments 13, 16 and 19 have been divided into two sections. Filament 13 has been broken into a left hand filament 13a and a right hand filament 13b, and these left and right hand sections are joined together at a common support post 61. Similarly, the filament 16 is divided into a left hand section 16a and a right hand section 16b joined together at a central support post 62, and the lower filament 19 is divided into a left hand section 19a and a right hand section 19b joined together at a support post 63. The vertical filaments 14, 15, 17 and 18 are the same as in the light of FIG. 1. Four additional diagonal filaments are also provided in the light of FIG. 7, these being filaments 66–69 and all of the latter are joined together at the central support post 62. Separate outer support posts must be provided for the latter filaments, and these are indicated by reference characters 71–74.

The combinations of filaments that must be illuminated to produce almost any numeral will now be more complex for the light of FIG. 7 than for the light of FIG. 1 simply because any horizontal filament that enters into the reproduction of a numeral will not require that at least two such horizontal filaments be energized. For example, the numeral 7 now requires that both filaments 13a and 13b be energized along with the vertical filaments 15 and 18. As in the case of the simpler form of light in FIG. 1, any support post, such as the support post 61 that has more than one filament connected to it, must be the support post that goes to the comon terminal of the light. To take a specific example, an image corresponding to the letter B can be formed by illuminating the filaments 13a, 13b, 67, 16a, 16b, 18, 19b, 19a, 17 and 14. One end of each of these filaments is supported by a support post that also supports another filament. These common support posts involved in the letter B are, in the order in which they occur in tracing out the letter, the posts 61, 62, 26, 63 and 24. By connecting all of these support posts to a common terminal and by connecting one terminal of a source of energizing voltage to that common terminal and the other terminal of the voltage source to the support posts 21, 22, 72, 27, 28, 30, 32, 31, 29 and 23, which are again listed in the order in which they occur in tracing out the letter, an intelligible image of the letter B will be formed.

The additional complexity of letters requires not only the diagonal filaments 66–69 but two central vertical filaments 76 and 77 joined together and connected to the post 62. The upper end of the filament 76 is connected to a post 78 and the lower end of the filament 77 to a post 79.

FIG. 8 shows in a perspective view the arrangement of the support posts at each of the corners. In this figure only the lower left hand corner is illustrated with the support posts 29, 31 and 74. The shortest of these posts has arbitrarily been chosen to be the post 31, which is the one that is connected to the filament 19a. The support post 29 is longer than the support post 31 and in this embodiment is indicated as extending twice as far above the level of the base constructure 15b as the support post 31. The filament 17 is connected to or near the top of the support post 29 so that it lies in a plane substantially parallel to the plane in which the filament 19a is located, but these planes are spaced apart by a vertical distance of only a few thousandths of an inch so that when the light is viewed from the front surface, which is the way that it is viewed in FIG. 7, these filaments appear to be in the same plane. The diagonal filament 69 must cross both of the filaments 17 and 19a without touching either and is therefore, connected to a third support post 74 that extends three times as far above the surface of the base structure 156 as does the support post 31. The filament 69 is therefore, closer to the faceplate of the light in FIG. 7 than is either the filament 19a or 17. All three of the support posts 29, 31 and 74 are hermetically sealed into a glass eyelet 81 which, in turn, is hermetically sealed into the metal base plate 156. As in the case of the all-glass base plate 56 in the light in FIG. 1, the base plate 156 could also be made of glass in which case the eyelet 81 could simply melt and become a part of the overall glass base plate.

While this invention has been described in terms of specific embodiments, it will be apparent to those skilled in the art that modifications may be made therein without departing from the true scope of the invention as defined by the following claims.

What is claimed is:

1. The method of manufacturing a filamentary light having a plurality of filaments *each being* supported at [each] *their* [end] *ends* by *select conducting support posts, said select support posts including* first, second, third and fourth conductive support posts, said first and third support posts being disposed closely adjacent to each other [and said second and fourth support posts being disposed closely adjacent to each other], including the steps of:

extending [the] *a* first one of said filaments in one direction in a first plane, *substantially parallel to a base plate,* extending a second one of said filaments in a second direction in a second plane substantially parallel to said first plane; [,]

spacing said filament in one plane from the filament in the other plane by a distance so small that the filaments appear to be in substantially the same plane, connecting one end of said first filament to said first support post and the other end of said first filament to said second support post, connecting one end of said second filament to said third support post and connecting the other end of said filament to said fourth support post [, and] *thereby* crossing said first and second filaments near the [respective ends thereof] *first and third support posts.*

2. The invention as defined in claim 1 including the step of enclosing the filaments and posts in an enclosure having a substantially entirely transparent faceplate.

3. The invention as defined in claim 2 in which at least one of said posts is hollow.

References Cited

The following references, cited by the Examiner, are of record in the patented file of this patent or the original patent.

UNITED STATES PATENTS 2,878,418 3/1959 Garfinkel et al. ---- 313—272 X

ROY LAKE, Primary Examiner

J. W. DAVIE, Assistant Examiner